United States Patent
Lee et al.

(10) Patent No.: US 11,842,076 B2
(45) Date of Patent: Dec. 12, 2023

(54) STORAGE SYSTEM AND OPERATING METHOD FOR SAME

(71) Applicant: SAMSUNG ELECTRONICS CO., LTD., Suwon-si (KR)

(72) Inventors: Won Chul Lee, Yongin-si (KR); Mun Seop Lim, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/478,449

(22) Filed: Sep. 17, 2021

(65) Prior Publication Data
US 2022/0308795 A1 Sep. 29, 2022

(30) Foreign Application Priority Data

Mar. 29, 2021 (KR) .......................... 10-2021-0040122

(51) Int. Cl.
G06F 3/06 (2006.01)

(52) U.S. Cl.
CPC .......... G06F 3/0659 (2013.01); G06F 3/0613 (2013.01); G06F 3/0653 (2013.01); G06F 3/0673 (2013.01)

(58) Field of Classification Search
CPC .... G06F 3/0659; G06F 3/0613; G06F 3/0653; G06F 3/0673
See application file for complete search history.

(56) References Cited

U.S. PATENT DOCUMENTS

| | | | |
|---|---|---|---|
| 6,292,856 B1 | 9/2001 | Marcotte | |
| 6,779,059 B2 | 8/2004 | Han et al. | |
| 7,305,537 B1 | 12/2007 | Moore et al. | |
| 9,998,395 B1 | 6/2018 | Gaudlip | |
| 10,048,874 B1 | 8/2018 | Shveidel et al. | |
| 2009/0172212 A1 | 7/2009 | Stanton | |
| 2018/0341690 A1* | 11/2018 | Osada ................. | G06F 12/0868 |
| 2019/0050341 A1* | 2/2019 | Veal ..................... | G06F 12/0246 |
| 2021/0349823 A1* | 11/2021 | Karm .................. | G06F 12/0842 |

FOREIGN PATENT DOCUMENTS

| KR | 1338566 B1 | 7/2012 |
|---|---|---|
| KR | 20140094186 A | 7/2014 |

OTHER PUBLICATIONS

Kang, Qiao. Scalable Communication and I/O Algorithms for High Performance Computing Systems. Diss. Northwestern University, 2020. (Year: 2020).*

* cited by examiner

*Primary Examiner* — Nicholas J Simonetti
(74) *Attorney, Agent, or Firm* — Fish & Richardson P.C.

(57) ABSTRACT

A storage system includes a storage device and an overlap checker. The overlap checker receives I/O commands of the storage device, extracts characteristics of the received I/O commands, issues a first merge command including N first I/O commands among the I/O commands in response to the extracted characteristics, wherein 'N' is a natural number greater than 1. And each of the first I/O commands instructs operation on a position corresponding to an offset in a region of the storage device corresponding to a logical address, wherein the characteristics of the I/O commands include the logical address and the offset.

14 Claims, 18 Drawing Sheets

STORAGE SYSTEM AND OPERATING METHOD FOR SAME

This U.S. nonprovisional application claims priority under 35 U.S.C. § 119 to Korean Patent Application No. 10-2021-0040122 filed on Mar. 29, 2021 in the Korean Intellectual Property Office, the subject matter of which is hereby incorporated by reference.

BACKGROUND

1. Field of the Disclosure

The inventive concept relates generally to storage systems and operating methods for storage systems.

2. Description of the Related Art

Various storage devices have been widely adopted to receive, store, process and provide relatively large amount of data. So-called flash memory (or a flash memory device) is one type of non-volatile memory (NVM) capable of retaining stored data in the absence of applied power. Many different types of storage devices (e.g., an embedded Multi-Media Card (eMMC), a Universal Flash Storage (UFS), a Solid State Drive (SSD), etc., as well as a variety of memory card types) incorporate one or more flash memory devices.

However, when write command(s) and/or read command(s) (hereafter in any reasonable number or combination, "read/write commands") are executed by a NVM in one order, different from another order defined for read/write commands by the storage device, incorrect data may be read and/or written. Accordingly, there is a need for storage device operating methods that execute read/write commands in a NVM in accordance with the order defined by the storage device.

SUMMARY

Embodiments of the inventive concept provide storage systems exhibiting improved performance Embodiments of the inventive concept provide operating methods for storage systems exhibiting improved performance.

In one aspect, embodiments of the inventive concept provide a storage system including a storage device and an overlap checker. The overlap checker is configured to receive I/O commands of the storage device, extract characteristics of the I/O commands, wherein the characteristics of the I/O commands include a logical address and an offset, and issue a first merge command including N first I/O commands among the I/O commands in response to the extracted characteristics, wherein 'N' is a natural number greater than 1, and each of the first I/O commands instructs a read/write operation on a position corresponding to an offset in a region of the storage device corresponding to a logical address.

In another aspect, embodiments of the inventive concept provide a storage system including a storage device and an overlap checker. The overlap checker is configured to receive a first I/O command instructing an operation on a position corresponding to an offset in a region of the storage device corresponding to a logical address, store the logical address and the offset in a pending queue, and issue a first merge command in response to the logical address and the offset stored in the pending queue. The first merge command includes N first I/O commands among the first I/O commands, wherein 'N' is a natural number greater than 1.

In still another aspect, embodiments of the inventive concept provide an operating method for a storage system including a storage device and an overlap checker. The method includes; executing in the storage device an operation instructed by a first I/O command in a first region of the storage device corresponding to a first logical address, receiving in the overlap checker second I/O commands instructing operation of the storage device, wherein once the storage device completes execution of the operation instructed by the first I/O command in the first region of the storage device corresponding to the first logical address, the overlap checker issues a first merge command including N second I/O commands instructing an operation on the first region of the storage device corresponding to the first logical address, wherein 'N' is a natural number greater than 1.

However, the scope of the inventive concept is not limited to only the aspects summarized above. Rather, other aspects and features of the inventive concept will become more apparent to those skilled in the art upon consideration of the following detailed description together with the accompanying drawings.

BRIEF DESCRIPTION OF THE DRAWINGS

The making and use of the inventive concept may be understood upon consideration of the certain embodiments illustrated in the accompanying drawings, in which.

DETAILED DESCRIPTION

Throughout the written description and drawings, like reference number and labels are used to denote like or similar elements, components, features and/or method steps.

Figure 1:
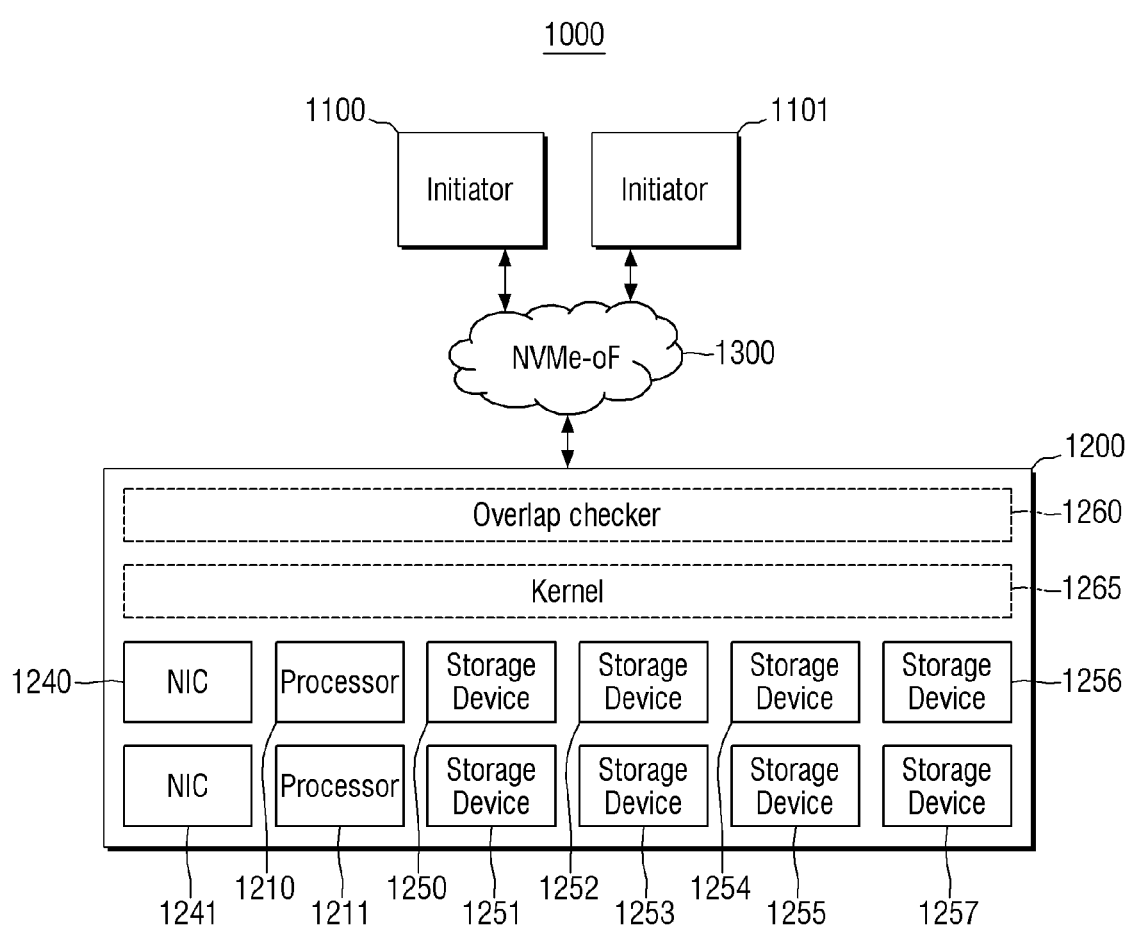
FIGS. 1 and 2 are respective, conceptual block diagrams illustrating a storage system according to embodiments of the inventive concept.
Figure 2:
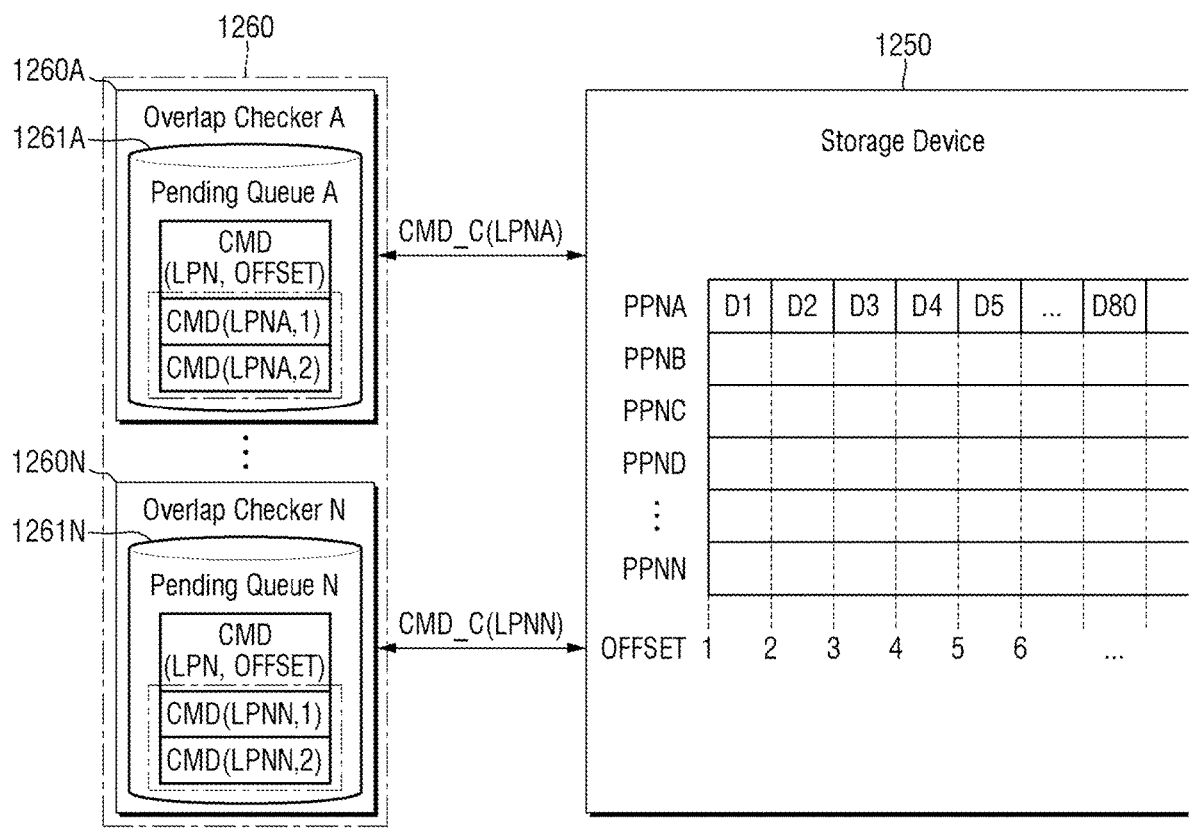

FIGS. 1 and 2 are respective, conceptual block diagrams illustrating a storage system 1000 according to embodiments of the inventive concept.

Referring to FIGS. 1 and 2, the storage system 1000 may include initiators 1100 and 1101, a target device 1200, and a network 1300. The target device 1200 may include Network Interface Cards (NICs) 1240 and 1241, processors 1210 and 1211, a storage devices (e.g., 1250, 1251, 1252, 1253, 1254, 1255, 1256 and 1257—hereafter collectively, "storage devices 1250 to 1257"), an overlap checker 1260 and a kernel 1265.

The initiators 1100 and 1101 may communicate with the target device 1200 through a network 1300. The network 1300 may be implemented according to one or more protocol(s), such as a NVM express (NVMe), or NVMe over Fabrics (NVMe-oF). Thus, in some embodiments, the structure and operation of the storage devices 1250 to 1257 may variously defined in accordance with a NVMe standard.

The overlap checker 1260 may control the target device 1200 at an operating system level. The kernel 1265 may operate below the overlap checker 1265. The kernel 1270 may control or manage the NICs 1240 and 1241, the processors 1210 and 1211, and storage devices 1250 to 1257 which are used to execute the operations or functions implemented by the overlap checker 1260.

The number of initiators 1100 and 1101, the NICs 1240 and 1241, the processors 1210 and 1211, and the storage devices 1250 to 1257 shown in the drawing may various.

The overlap checker 1260 may receive various input and/or output (hereafter, "I/O") commands from the initiators 1100 and 1101. The overlap checker 1260 may store the received I/O commands in pending queues 1261A to 1261N. The I/O commands may be, for example, read/write commands That is, the I/O commands may instruct read operations and/or write operation (hereafter collectively, in any reasonable number and combination, "read/write operations") for the regions of the storage devices 1250 to 1257 in accordance with logical address(es) defined by the initiators 1110 and 1101.

The overlap checker 1260 may include multiple overlap checkers (e.g., 1260A to 1260N). Here, the overlap checkers 1260A to 1260N may each issue merge commands (e.g., CMD_C(LPNA) to CMD_C(LPNN)) associated with different logical addresses (e.g., LPNA to LPNN). In this regard, for example, a first overlap checker 1260A may issue a merge command CMD_C(LPNA) for a first logical address LPNA.

In some embodiments, the number of overlap checkers 1260A to 1260N may be the same as the number of different logical addresses LPNA to LPNN, and the overlap checkers 1260A to 1260N may operate independently.

Each of the overlap checkers 1260A to 1260N may include a corresponding pending queue (e.g., 1261A to 1261N). Here, each of the pending queues 1261A to 1261N may store I/O commands for logical addresses LPNA to LPNN, as well as logical addresses and/or offsets. For example, a first pending queue 1261A may store I/O commands CMD(LPNA,1) and CMD(LPNA,2) for the first logical address LPNA.

Each of the overlap checkers 1260A to 1260N may issue a single merge command (e.g., CMD_C(LPNA) to CMD_C (LPNN) including N I/O commands, where 'N' is a natural number greater than 1, from among the I/O commands stored in the pending queues 1261A to 1261N. For example, the overlap checker 1260A may issue a single merge command CMD_C(LPNA) including I/O commands CMD (LPNA,1) and CMD(LPNA,2) for the first logical address LPNA.

Figure 3:
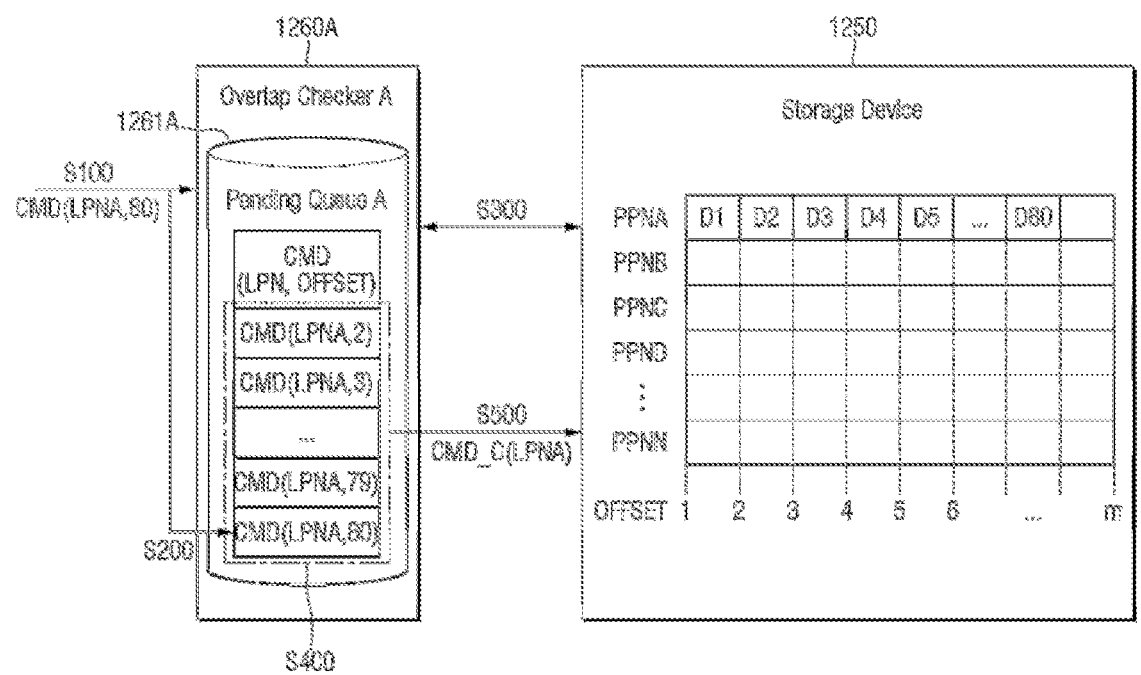
FIG. 3 is a conceptual block diagram illustrating operation of the storage system of FIG. 1.
Figure 4:
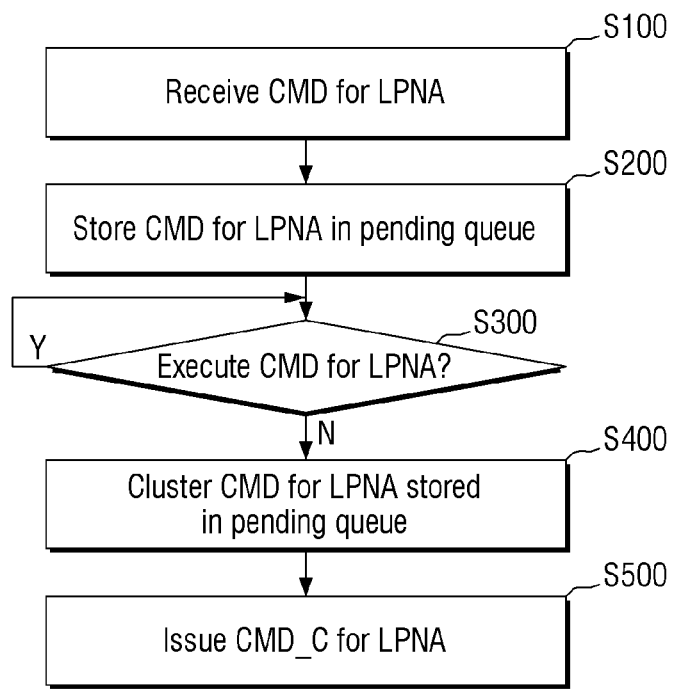
FIG. 4 is a flowchart summarizing in one example an operating method for the storage system of FIG. 1.
Figure 5:
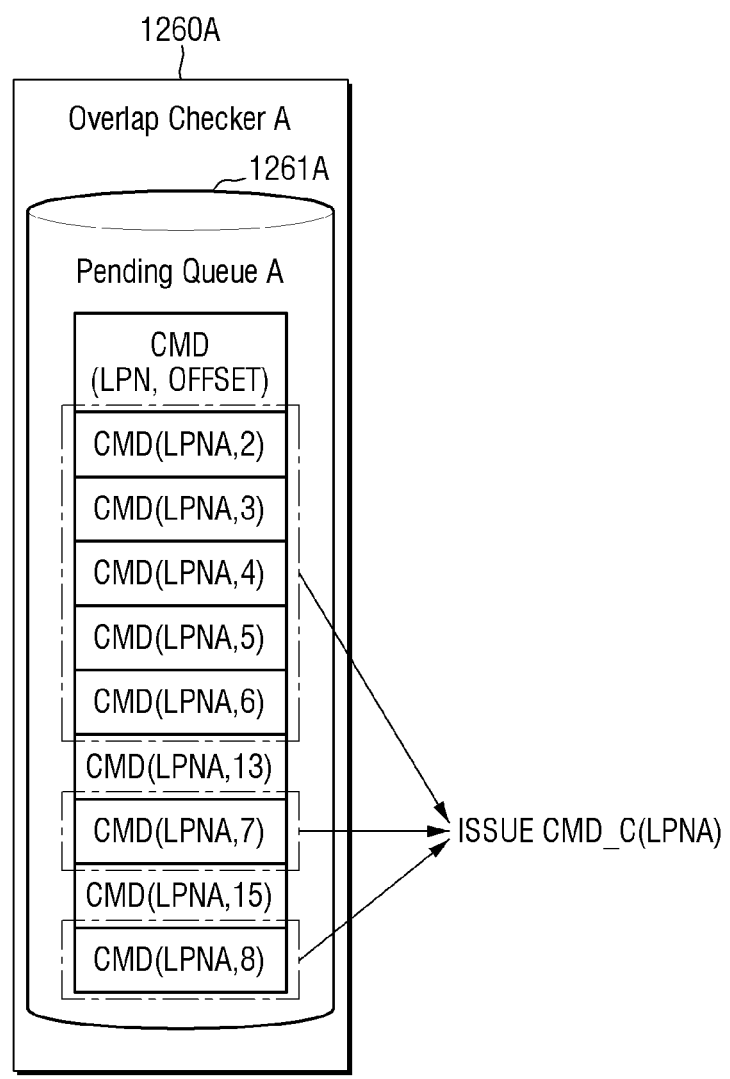
FIGS. 5 and 6 are conceptual block diagrams further illustrating operating methods for the storage system of FIG. 1.
Figure 6:
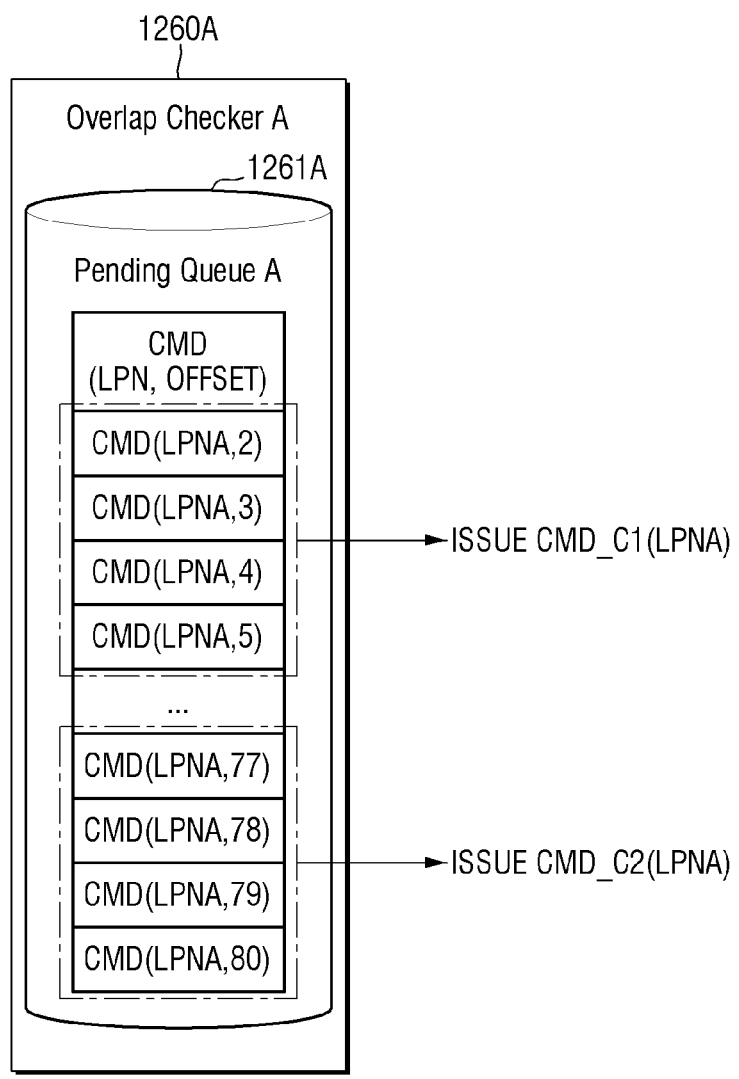

FIG. 3 is a conceptual block diagram illustrating operation of the storage system 1000 of FIG. 1, FIG. 4 is a flowchart summarizing in one example an operating method for the storage system 1000 of FIG. 1, and FIGS. 5 and 6 are respective, conceptual diagrams further illustrating operation of the storage system 1000 of FIG. 1. Hereinafter, although the written description is presented in relation to the overlap checker 1260A, the processor 1210 and the storage device 1250 for clarity of explanation, those skilled in the art appreciate that similar relationships and functionality may be ascribed to each one of the overlap checkers 1260B to 1260N, the processor 1211 and the storage devices 1251 to 1257 of FIG. 1.

Referring to FIGS. 1, 3 and 4, the overlap checker 1260A may receive a first I/O command CMD(LPNA,80) from the initiators 1100 and 1101 (S100). The first I/O command CMD(LPNA,80) may instruct an operation in relation to a memory storage position corresponding to the first offset 80 in the first physical address PPNA of the storage device 1250 corresponding to the first logical address LPNA. For example, the first I/O command CMD(LPNA,80) may instruct to read the data D1 stored at a position corresponding to a first offset 80 in the first physical address PPNA of the storage device 1250 that corresponds to the first logical address LPNA. Alternately, the first I/O command CMD (LPNA,80) may instruct to write the data D1 at the position corresponding to the first offset 80 in the first physical address PPNA of the storage device 1250 that corresponds to the first logical address LPNA.

The first physical address PPNA corresponding to the first logical address LPNA may be determined, for example, by a mapping table stored in a flash translation layer (FTL) associated with the storage device. The first offset 80 may indicate, for example, a starting position for data beginning at the first physical address PPNA.

The overlap checker 1260A may store the first I/O command CMD(LPNA,80) in the pending queue 1261A in response to the first I/O command CMD(LPNA,80) (S200). The overlap checker 1260A may store the first logical address LPNA and the first offset 80 in the pending queue 1261A along with the first I/O command CMD(LPNA,80). The overlap checker 1260A may sequentially store the first I/O command in the pending queue 1261A. The overlap checker 1260A may store the logical address and offset in the pending queue 1261A along with the first I/O command, in accordance with the order of the first I/O commands to be received.

The overlap checker 1260A may determine whether the storage device 1250 executes the operation instructed by the second I/O command at the first physical address PPNA of the storage device 1250 corresponding to the first logical address LPNA, in response to the first I/O command CMD (LPNA,80) (S300). That is, the overlap checker 1260A may determine whether the first logical address LPNA instructed by the first I/O command CMD(LPNA,80) is the same as the logical address instructed by the second I/O command.

When the storage device 1250 is executing the operation instructed by the second I/O command at the first physical address PPNA of the storage device 1250 corresponding to the first logical address LPNA, the overlap checker 1260A may return to step S300.

When the storage device 1250 completes execution of the operation instructed by the second I/O command at the first physical address PPNA of the storage device 1250 corresponding to the first logical address LPNA, the overlap checker 1260A may cluster the first I/O command stored in the pending queue 1261A (S400). The overlap checker 1260A may cluster the first I/O command stored in the pending queue 1261A in relation to the first logical address LPNA. The overlap checker 1260A may cluster the first I/O command that instructs the operation of the first physical address PPNA corresponding to the first logical address LNPA among the first I/O commands stored in the pending queue 1261A.

The overlap checker 1260A may cluster the first I/O command that instructs the operation of the first physical address PPNA of the storage device 1250 corresponding to the first logical address LPNA stored in the pending queue 1261A in relation to an offset. The overlap checker 1260A may cluster the first I/O command of the first logical address LPNA using a continuity of offsets.

For example, referring to FIG. 5, the overlap checker 1260A may cluster the first I/O commands CMD(LPNA,2), CMD(LPNA,3), CMD(LPNA,4), CMD(LPNA,5), CMD(LPNA,6), CMD(LPNA,7), and CMD(LPNA,8) having continuous offsets 2, 3, 4, 5, 6, 7, and 8.

The overlap checker 1260A may issue the clustered first I/O command as a single merge command CMD_C(LPNA) (S500). Thus, the merge command CMD_C(LPNA) may include N first I/O commands, wherein 'N' is defined by the cluster size. For example, if the cluster size is 4, the merge command CMD_C(LPNA) may include four (4) I/O commands Here, the cluster size N may be variously determined, and in some embodiments, N may be a preset or predetermined value.

For example, referring to FIG. 6 and assuming a cluster size of 4, the overlap checker 1260A may cluster first I/O commands CMD(LPNA,2), CMD(LPNA,3), CMD(LPNA,4) and CMD(LPNA,5) having offsets of 2, 3, 4 and 5, and may cluster first I/O commands CMD(LPNA,77), CMD(LPNA,78), CMD(LPNA,79) and CMD(LPNA,80) having offsets of 77, 78, 79 and 80. Thereafter, the overlap checker 1260A may issue the clustered first I/O commands CMD(LPNA,2), CMD(LPNA,3), CMD(LPNA,4) and CMD(LPNA,5) as the first merge command CMD_C1(LPNA), and may issue the clustered first I/O commands CMD(LPNA,77), CMD(LPNA,78), CMD(LPNA,79) and CMD(LPNA,80) as a second merge command CMD_C2(LPNA).

Referring to FIGS. 3 and 4, the storage device 1250 may fetch and execute the merge command CMD_C(LPNA) in response to the merge command CMD_C(LPNA). The storage device 1250 may execute the operation instructed by the merge command CMD_C(LPNA) at the first physical address PPNA of the storage device 1250 corresponding to the first logical address LPNA.

The storage device 1250 may search the first physical address PPNA corresponding to the first logical address LPNA in accordance with the merge command CMD_C(LPNA). The storage device 1250 may execute the operation instructed by the merge command CMD_C(LPNA) in a region corresponding to the first physical address PPNA. Since the merge command CMD_C(LPNA) includes the I/O command having the continuous offset in relation to (or inside) the first logical address LPNA, the storage device 1250 may execute operations instructed by the continuous I/O command inside the region corresponding to the first physical address PPNA.

When the storage device 1250 completes execution of the operation instructed by the merge command CMD_C(LPNA), the storage device 1250 may notify the overlap checker 1260A that execution of the merge command CMD_C(LPNA) is complete.

Since storage systems according to embodiments of the inventive concept essentially "fetch and execute" one merge command including multiple I/O commands, memory system delay and associated overhead may be reduced, as compared with storage systems fetching and executing I/O command(s) on a one by one basis. Accordingly, the overall performance of storage systems according to embodiments of the inventive concept may be improved.

Figure 7:
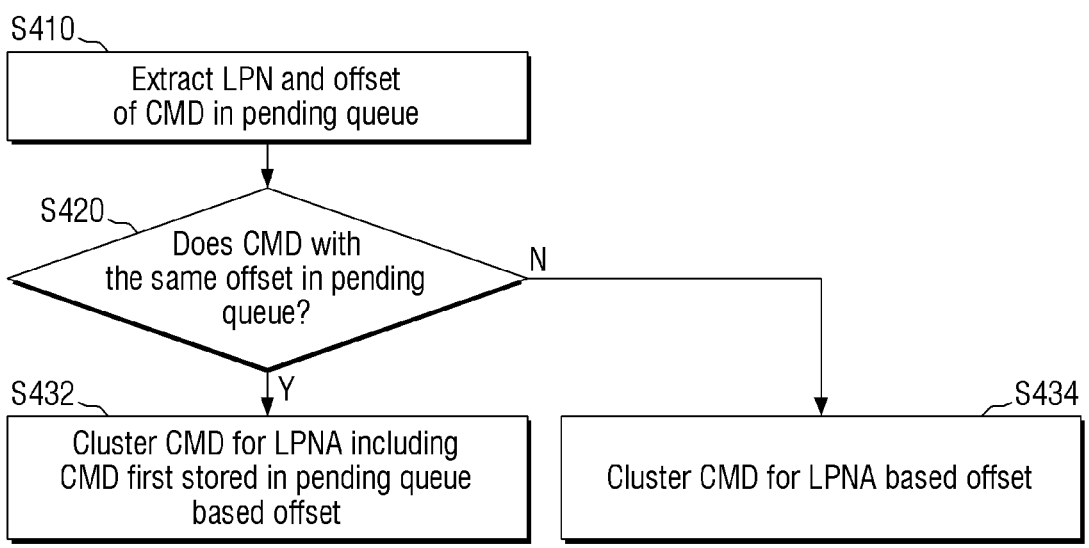
FIG. 7 is a flowchart further illustrating in one example the step S400 of the flowchart of FIG. 4.
Figure 8:
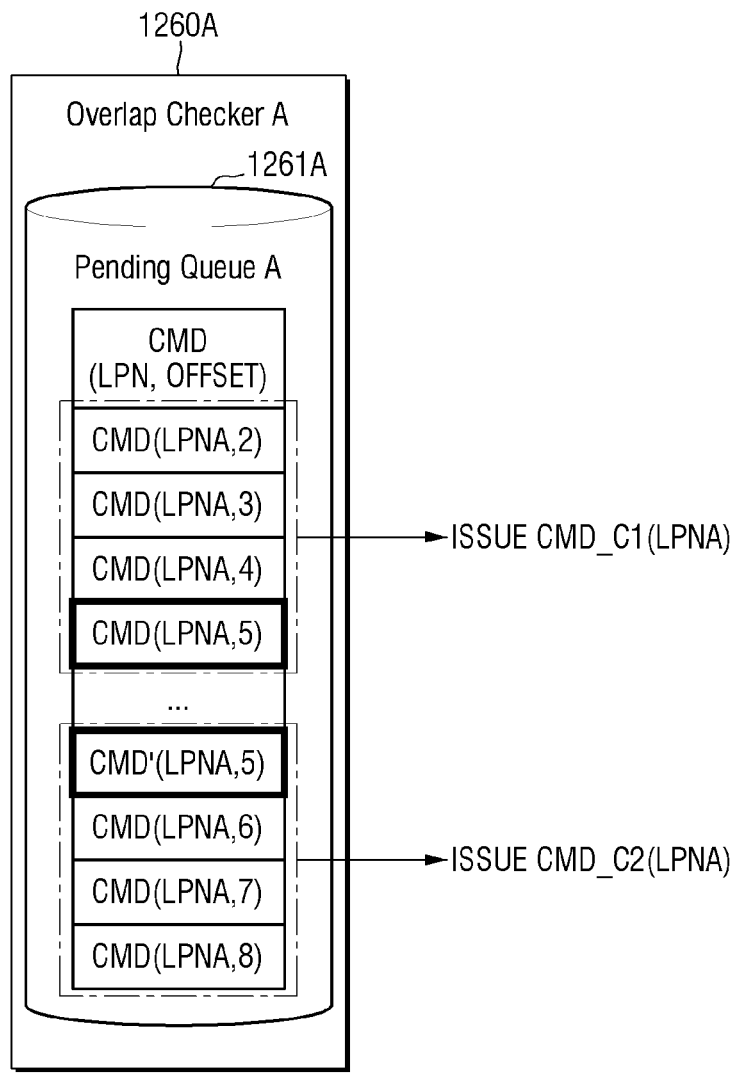
FIG. 8 is a conceptual block diagram illustrating in one example operating methods for storage systems according to embodiments of the inventive concept.

FIG. 7 is a flowchart further illustrating in one example the method step S400 of the operating method described in relation to FIG. 4, and FIG. 8 is a conceptual block diagram further illustrating operation of the storage system 1000 of FIG. 1.

Referring to FIGS. 1, 4, 7 and 8, the overlap checker 1260A may extract the logical addresses and offsets of I/O commands stored in the pending queue 1261A (S410).

The overlap checker 1260A may determine whether there are I/O commands having the same offset among the I/O commands (S420).

When there are commands having the same offset among the I/O commands stored in the pending queue 1261A (S420=YES), the overlap checker 1260A may extract the I/O command in response to the extracted offsets to include the I/O command received by the storage system first among the I/O commands having the same offset (S432). Because the pending queue 1261A stores the I/O command in accordance with the order in which the I/O command is received, the overlap checker 1260A may determine the stored I/O command received by the storage system first among the I/O commands having the same offset, in accordance with the order stored in the pending queue 1261A.

However, when there are no I/O commands having the same offset among the I/O commands stored in the pending queue 1261A (S420=NO), the overlap checker 1260A may cluster the I/O commands in relation to the offset (S434).

Referring to FIG. 8 as one more particular example, the first I/O command CMD(LPNA,5) and the second I/O command CMD'(LPNA,5) stored in the pending queue 1261A may instruct the operation on the position corresponding to the first offset 5 in the first region of the storage device corresponding to the first logical address LPNA. The first I/O command CMD(LPNA,5) may be stored in a higher rank inside the pending queue 1261A than the second I/O command CMD'(LPN(A,5). That is, the first I/O command CMD(LPNA,5) may be received by the storage system before the second I/O command CMD'(LPNA,5). The overlap checker 1260A may cluster the first I/O command CMD(LPNA,5) and the I/O commands CMD(LPNA,2), CMD(LPNA,3) and CMD(LPNA,4) having continuous offsets 2, 3 and 4 to issue the first merge command CMD_C1(LPNA).

The storage device may execute the operation instructed by the first merge command CMD_C1(LPNA) in the region corresponding to the first logical address LPNA, in response to the first merge command CMD_C1(LPNA). When the storage device completes execution of the operation instructed by the first merge command CMD_C1(LPNA), the overlap checker 1260A may cluster the second I/O command CMD'(LPNA,5) and the I/O commands CMD(LPNA,6), CMD(LPNA,7) and CMD(LPNA,8) having continuous offsets 6, 7 and 8 to issue a second merge command CMD_C2(LPNA). The storage device may execute the operation instructed by the second merge command CMD_C2(LPNA) in the region corresponding to the first logical address LPNA, in response to the second merge command CMD_C2(LPNA).

For example, after receiving a write command associated with the writing of data at a position corresponding to offset 5 in the region corresponding to the first logical address LPNA, when receiving a read command associated with the reading of data stored at the position corresponding to the offset 5 in the region corresponding to the first logical address LPNA, if the read command is executed first, the data written by the write command is not read. After receiving a first write command of writing the first data at the position corresponding to the offset 5 in the region corresponding to the first logical address LPNA, when receiving a second write command of writing the second data at the position corresponding to the offset 5 in the region corresponding to the first logical address LPNA, if the first write command is executed after the second write command is executed, the second data instructed by the second write command is not written. Also, after receiving the read command of reading the data at the position corresponding to the offset 5 in the region corresponding to the first logical address LPNA, when receiving the write command of writing the data at the position corresponding to offset 5 in the region corresponding to the first logical address LPNA, if the write command is executed first, the data instructed by the read command is not read. Hence, there is a need for an operating method that better ensures that the order of execution for the I/O commands precludes such hazard to data integrity.

Accordingly, storage systems according to embodiments of the inventive concept may issue the first I/O command CMD(LPNA,5) and the second I/O command CMD'(LPNA, 5) that instruct the operation on the position corresponding to the first offset 5 in the first region corresponding to the first logical address LPNA as the first merge command CMD_C1(LPNA) and the second merge command CMD_C2(LPNA) different from each other. Since the first I/O command CMD(LPNA,5) is received by the storage system first, the first merge command CMD_C1(LPNA) may be issued before the second merge command CMD_C2 (LPNA). Therefore, the effective execution order for the I/O commands stored in the pending queue 1261A may be appropriately ensured against data hazards like described above.

Figure 9:
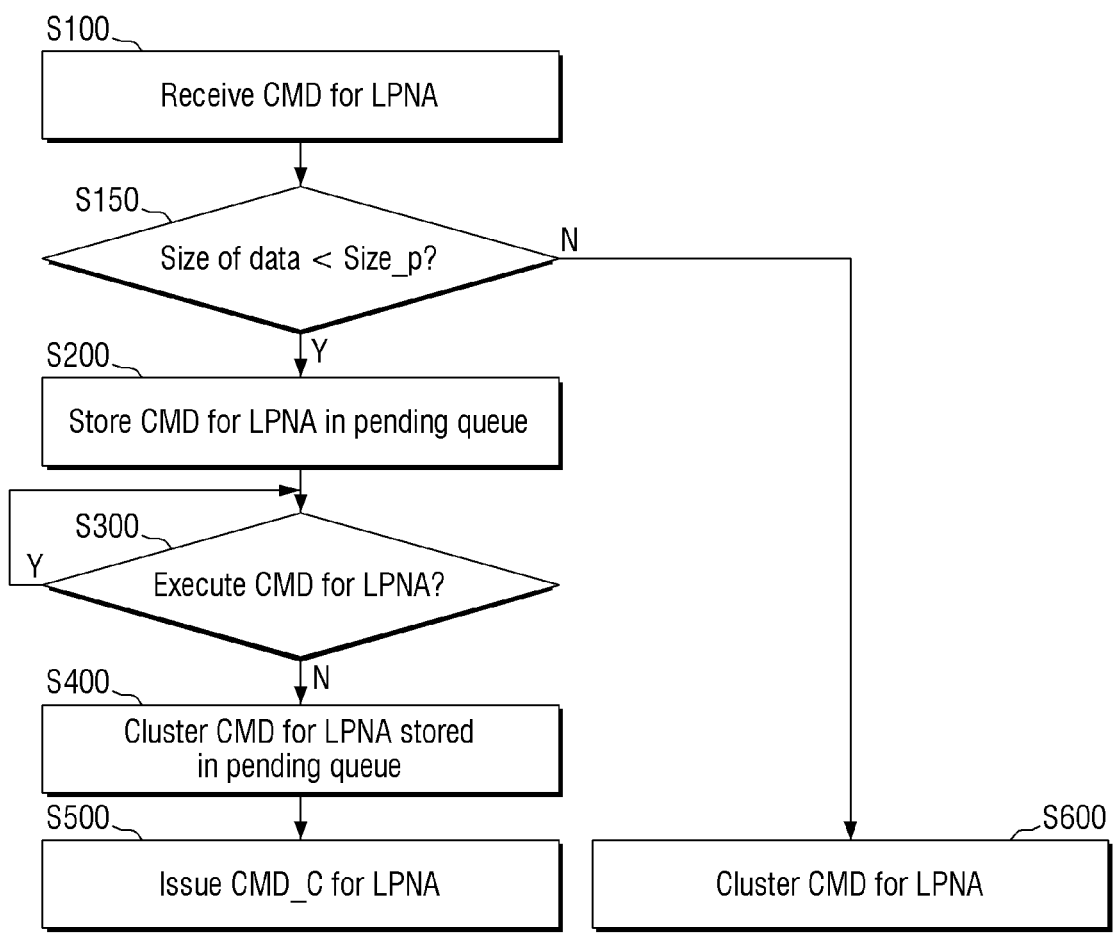
FIG. 9 is a flowchart summarizing in one example an operating method for the storage system of FIG. 1.

FIG. 9 is a flowchart summarizing in one example an operating method for the storage system 1000 of FIG. 1, and may be compared with the operating method of FIG. 4.

Referring to FIGS. 1, 3, 4 and 9, the overlap checker 1260A receives the first I/O command CMD(LPNA,80) from the initiators 1100 and 1101 (S100), and may then determine whether the size of the data instructed by the first I/O command CMD(LPNA,80) is larger than a predetermined size (S150). For example, the first I/O command CMD(LPNA,80) may instruct to read the first data stored at the position corresponding to the first offset 80 in the region of the storage device 1250 corresponding to the first logical address LPNA. Alternately, the first I/O command CMD (LPNA,80) may instruct to write the data at the position corresponding to the first offset 80 in the region of the storage device 1250 corresponding to the first logical address LPNA.

If the size of the data instructed by the first I/O command CMD(LPNA,80) is smaller than the predetermined size (S150=YES), the overlap checker 1260A may execute the operation of S200. Here, the predetermined size may be, for example, a storage unit (mapping size) of the storage device 1250. That is, the predetermined size may be the size of the region of the storage device 1250 corresponding to the physical address PPN.

In this case, the first I/O command CMD(LPNA,80) may, for example, instruct the operation of metadata. The metadata may include, but is not limited to, for example, position information related to user data (logical address, physical address, etc.), the number of valid pages included in a memory block, determination as to which page of the memory block is valid, and the like.

However, if the size of the data instructed by the first I/O command CMD(LPNA,80) is greater than or equal to the predetermined size (S150=NO), the storage device 1250 may execute the operation instructed by the first I/O command CMD(LPNA,80) in the region inside the storage device 1250 corresponding to the first logical address LPNA (S600). In this case, the first I/O command CMD(LPNA,80) may, for example, instruct the operation of user data. Therefore, it is possible to reduce data latency due to the I/O operation of the user data.

Figure 10:
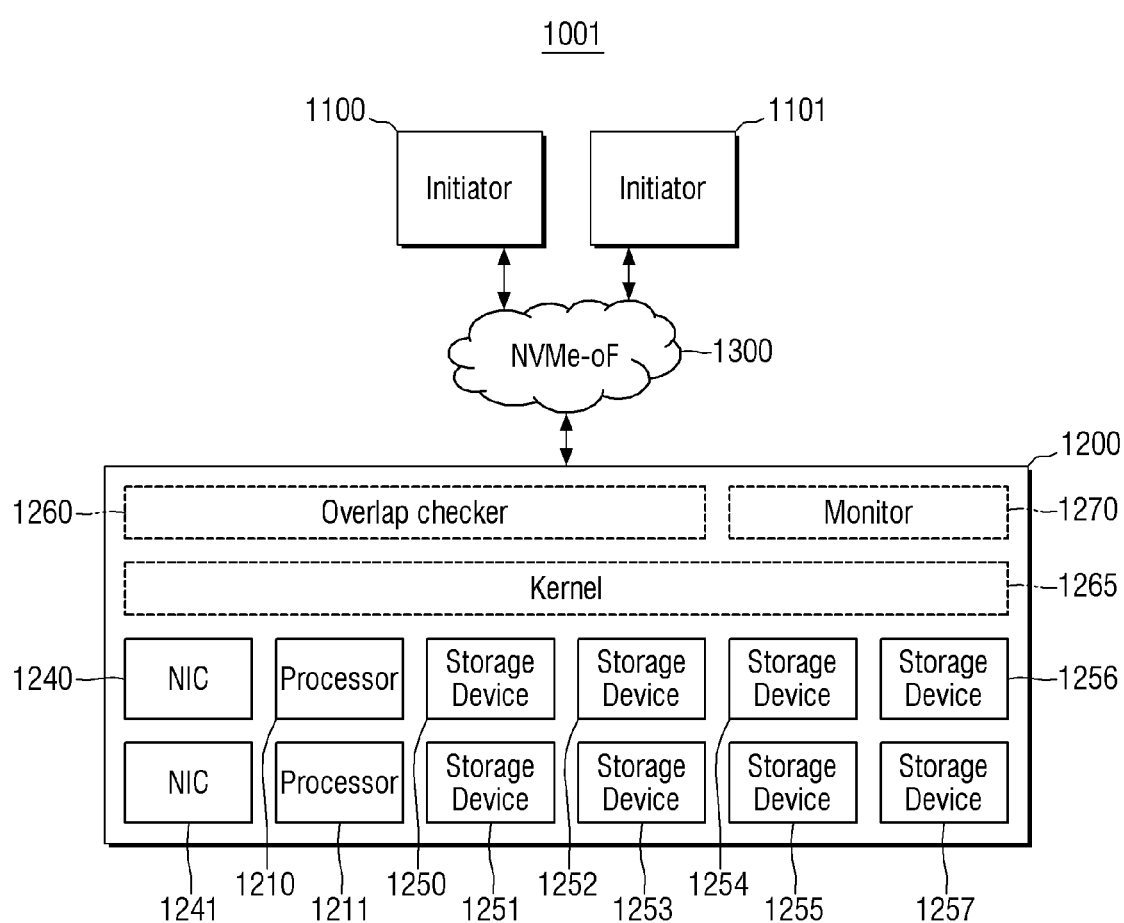
FIG. 10 is a conceptual block diagram illustrating a storage system according to embodiments of the inventive concept.
Figure 11:
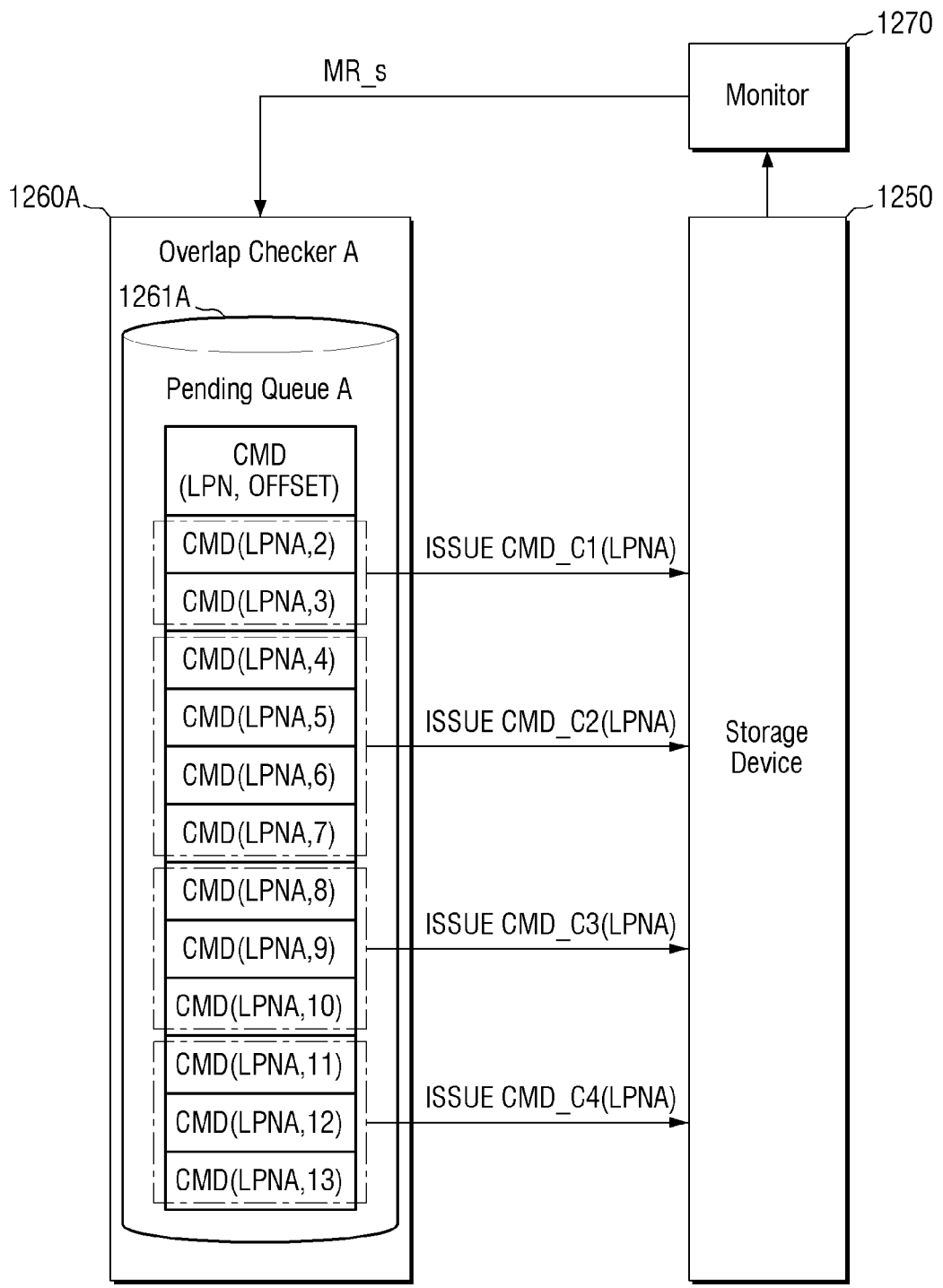
FIGS. 11 and 12 are conceptual block diagrams further illustrating operating methods for the storage system of FIG. 10.
Figure 12:
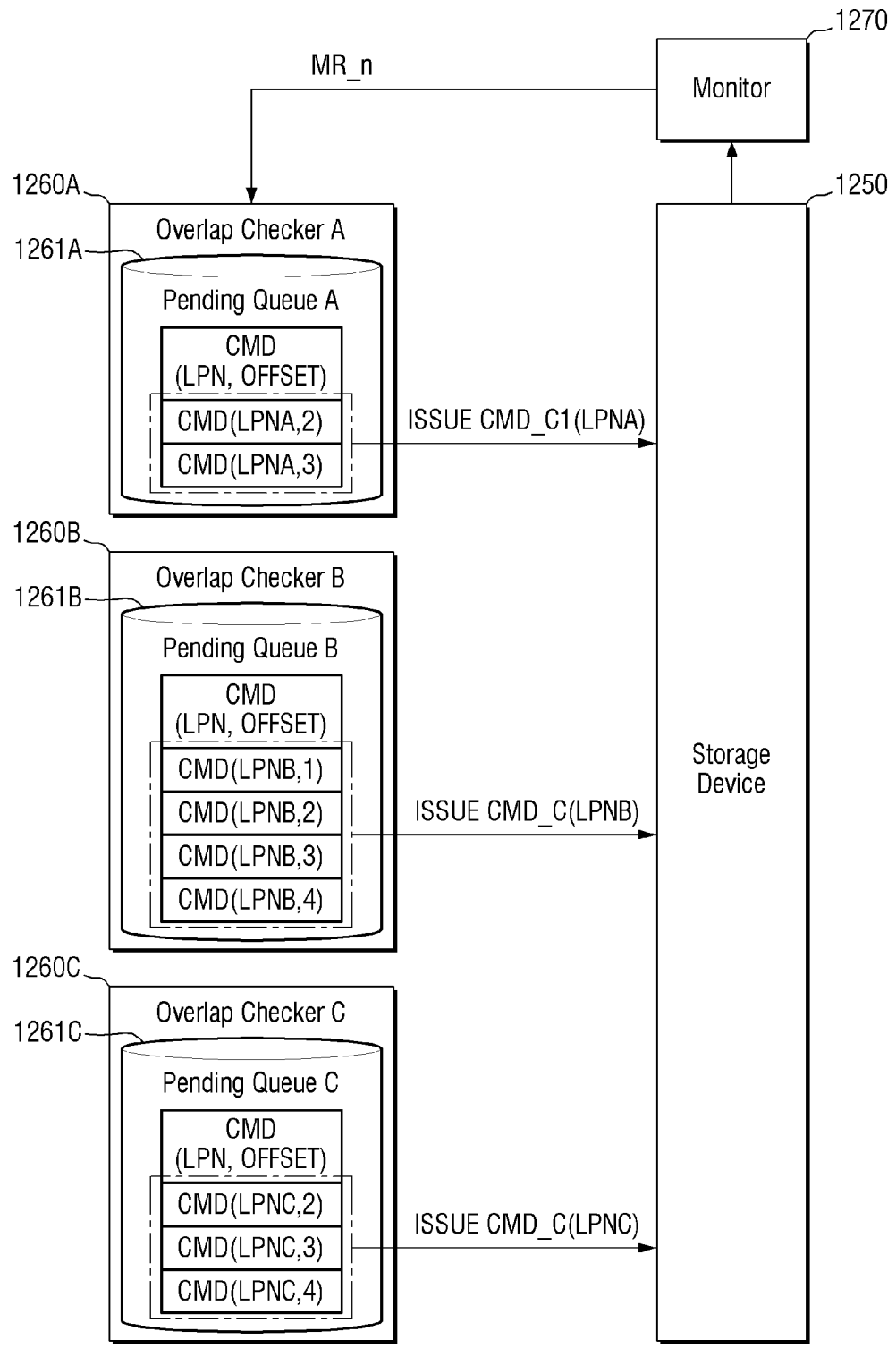

FIG. 10 is a conceptual block diagram illustrating a storage system 1001 according to embodiments of the inventive concept, and FIGS. 11 and 12 are conceptual block diagrams further illustrating operation of the storage system 1001 of FIG. 10.

Referring to FIGS. 10 and 11, the storage system 1001 may further include in relation to the storage system 1000 of FIG. 1—a monitor 1270. Here, the monitor 1270 may control a target device 1200 at the operating system level.

The monitor 1270 may monitor the storage device 1250 that executes the merge command. The monitor 1270 may monitor the speed at which the processor 213 executes the merge command. The monitor 1270 may provide a monitoring result MR_s to the overlap checker 1260A.

The overlap checker 1260A may determine the cluster size in response to the monitoring result MR_s. For example, the overlap checker 1260A may determine the number of I/O commands that may be simultaneously executed by the storage device 1250 in response to the monitoring result MR_s. The overlap checker 1260A may determine the number of I/O commands that may be simultaneously executed by the storage device 1250 by the cluster size.

The overlap checker 1260A may issue the merge command CMD_C(LPNA) depending on the determined cluster size. The merge command CMD_C(LPNA) may include I/O commands that correspond to the cluster size. That is, the number of I/O commands included in the merge command CMD_C(LPNA) may vary depending on the merge command CMD_C(LPNA). The storage device 1250 may execute the merge command CMD_C(LPNA).

For example, the storage device 1250 may execute a first merge command CMD_C1(LPNA) including two (2) I/O commands CMD(LPNA,2) and CMD(LPNA,3), may execute a second merge command CMD_C2(LPNA) including four (4) I/O commands CMD(LPNA,4), CMD(LPNA, 5), CMD(LPNA,6) and CMD(LPNA,7), and may execute a third merge command CMD_C3(LPNA) including three (3) I/O commands CMD(LPNA,8), CMD(LPNA,9) and CMD (LPNA,10). The monitor 1270 may monitor the speed at which the storage device 1250 executes the first merge command CMD_C1(LPNA), the speed at which the storage device 1250 executes the second merge command CMD_C2 (LPNA), and the speed at which the storage device 1250 executes the third merge command CMD_C3(LPNA). When the monitoring result MR_s, e.g., the speed at which the processor 213 executes the third merge command CMD_C3(LPNC) is the fastest, the overlap checker 1260A may determine 3 as the cluster size. The overlap checker 1260A may issue a fourth merge command CMD_C4 (LPNA) that includes three (3) I/O commands CMD(LPNA, 11), CMD(LPNA,12) and CMD(LPNA,13).

Referring to FIGS. 10 and 12, in the storage system 1001 of FIG. 10, the monitor 1270 may monitor the number of I/O commands included in the merge command executed by the storage device 1250. That is, the monitor 1270 may monitor the number of I/O commands that instruct the operation on the region inside the storage device 1250 corresponding to the same logical address LPNA among the I/O commands. The monitor 1270 may provide the monitoring result MR_n to the overlap checkers 1260A, 1260B and 1260C.

The overlap checkers 1260A, 1260B and 1260C may determine an average of the numbers of I/O commands included in the merge command in response to the monitoring result MR_n. The overlap checkers 1260A, 1260B and 1260C may determine an average of the numbers of the I/O commands as the cluster size.

The overlap checkers 1260A, 1260B and 1260C may issue the merge command CMD_C depending on the determined cluster size. The storage device 1250 may execute the merge command CMD_C.

For example, assuming that the first merge command CMD_C1(LPNA) and the second merge command CMD_C (LPNB) have already been issued. The first merge command CMD_C1(LPNA) that instructs the operation on the region inside the storage device 1250 corresponding to the first logical address LPNA may include two (2) I/O commands CMD(LPNA,2) and CMD(LPNA,3), and the second merge command CMD_C(LPNB) that instructs the operation on the region inside the storage device 1250 corresponding to the second logical address LPNB includes four (4) I/O commands CMD(LPNB,1), CMD(LPNB,2), CMD(LPNB, 3) and CMD(LPNB,4). In this case, the average of the numbers of I/O commands included in the merge command is 3. Therefore, the overlap checker 1260C may determine 3 as the cluster size. The overlap checker 1260C may issue a third merge command CMD_C(LPNC) that includes three (3) I/O commands CMD(LPNC,2), CMD(LPNC,3) and CMD(LPNC,4).

Figure 13:
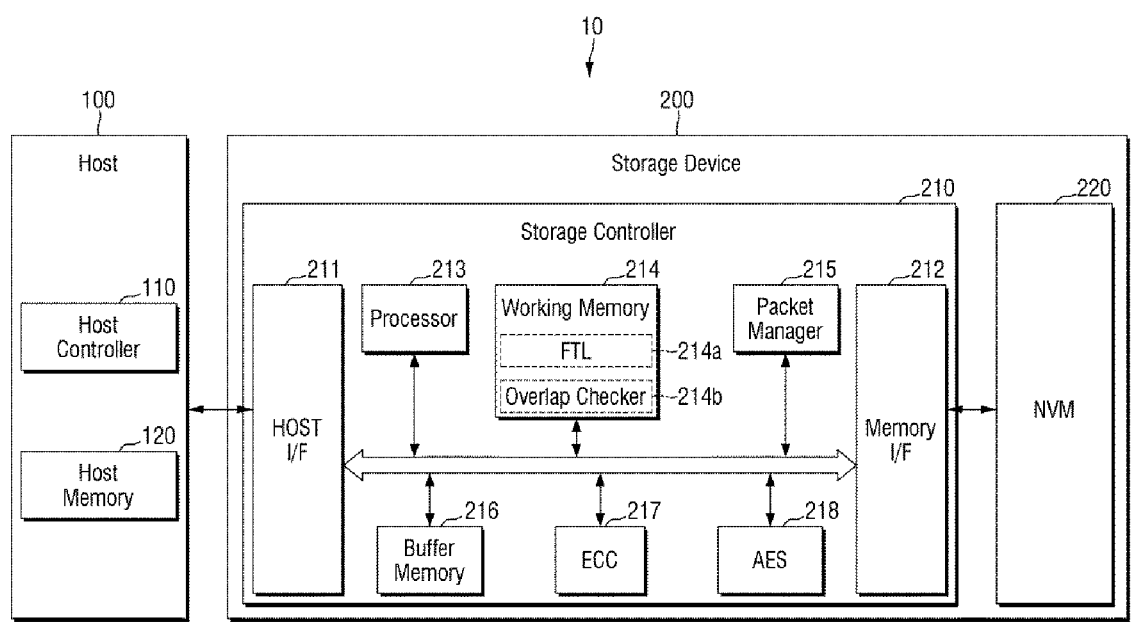
FIG. 13 is a block diagram illustrating a memory system according to embodiments of the inventive concept.

FIG. 13 is a block diagram illustrating a memory system 10 according to embodiments of the inventive concept.

The memory system 10 may generally include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of a Solid-State device (SSD), an embedded memory, and a removable external memory. When the storage device 200 is an SSD, the storage device 200 may be a device having a structure and/or operating method defined in accordance with an NVMe standard. When the storage device 200 is an embedded memory or an external memory, the storage device 200 may be a device having a structure and/or operating method defined in accordance with a UFS standard or an eMMC standard. Each of the host 100 and the storage device 200 may generate packet(s) according to one or more communication protocol(s) and transmit the resulting packets.

When the NVM 220 of the storage device 200 includes flash memory, the flash memory may include a two-dimensional (2D) NAND memory array or a three-dimensional (3D or vertical) NAND (VNAND) memory array. Alternately, the storage device 200 may include one or more other types of NVM. For example, the storage device 200 may include magnetic random access memory (RAM) (MRAM), spin-transfer torque MRAM (ST_MRAM), conductive bridging RAM (CBRAM), ferroelectric RAM (FRAM), phase-change RAM (PRAM), RRAM, etc.

In some embodiments, the host controller 110 and the host memory 120 may be implemented as separate semiconductor chips. Alternately, the host controller 110 and the host memory 120 may be integrated into a single semiconductor chip. As an example, the host controller 110 may be one or more of a number of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a processor 213. Further, the storage controllers 210 may further include a FTL 214, a packet manager 215, a buffer memory 216, an error correction code (ECC) engine 217, and an advanced encryption standard (AES) engine 218. The storage controllers 210 may further include a working memory 214 in which the FTL 214a is loaded. The processor 213 may execute the FTL 214a to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The working memory 214 operates under the control of the processor 213 and may be used as an operating memory, a buffer memory, a cache memory, and the like. For example, the working memory 214 may be implemented as a volatile memory such as dynamic RAM (DRAM) and/or static RAM (SRAM) and/or a NVM such as PRAM and/or flash memory.

The FTL 214a may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The overlap checker 214*b* may be loaded into the working memory 214. The overlap checker 214*b* may receive the I/O commands from the host 100. The overlap checker 214*b* may correspond to the overlap checker 1260 described above.

The overlap checker 214*b* may be implemented as firmware and/or software driven by the storage device 200. The overlap checker 214*b* may control the operation of the storage controller 210. Alternately, unlike the shown case, the overlap checker 214*b* may also be implemented as hardware and driven by the storage device 200. The overlap checker 214*b* may be implemented as separate hardware and included in the storage device 200.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. That is, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

Figure 14:
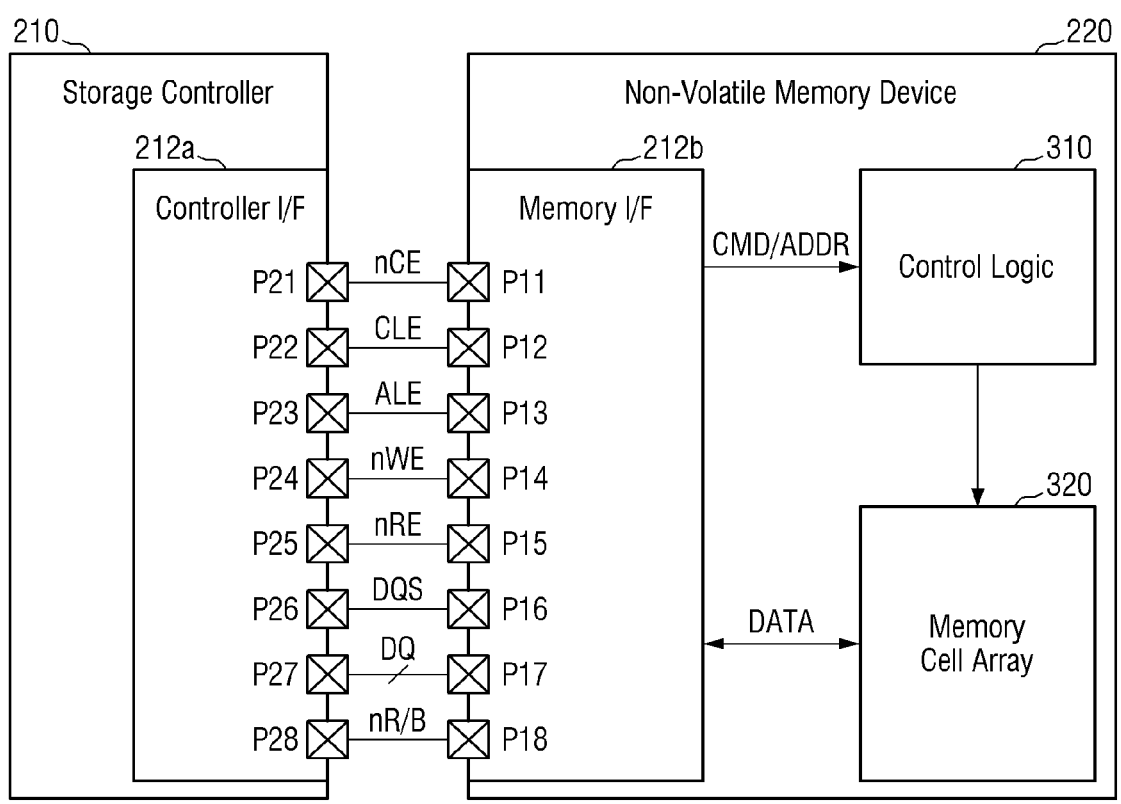
FIG. 14 is a block diagram further illustrating in one example the storage controller 210, the memory interface 212, and the non-volatile memory (NVM) 220 of FIG. 13.

FIG. 14 is a block diagram further illustrating in one example the storage controller 210, the memory interface 212, and the NVM 220 of FIG. 13. Here, the memory interface 212 of FIG. 13 may include a controller interface circuit 212*a*.

The NVM 220 may include first to eight pins P11 to P18, a memory interface circuit 212*b*, a control logic circuit 310, and a memory cell array 320.

The memory interface circuit 212*b* may receive a chip enable signal nCE from the storage controller 210 through the first pin P11. The memory interface circuit 212*b* may transmit and receive signals to and from the storage controller 210 through second to eighth pins P12 to P18 according to the chip enable signal nCE. For example, when the chip enable signal nCE is in an enable status (e.g., a low level), the memory interface circuit 212*b* may transmit and receive signals to and from the storage controller 210 through second to eighth pins P12 to P18.

The memory interface circuit 212*b* may receive a command latch enable signal CLE, an address latch enable signal ALE, and a write enable signal nWE from the storage controller 210 through second to fourth pins P12 to P14. The memory interface circuit 212*b* may receive a data signal DQ from the storage controller 210 or transmit the data signal DQ to the storage controller 210 through a seventh pin P17. The command CMD, the address ADDR, and the data DATA may be transferred through the data signal DQ. For example, the data signal DQ may be transferred through data signal lines. Here, the seventh pin P17 may include pins corresponding to the data signals.

The memory interface circuit 212*b* may acquire the command CMD from the data signal DQ received in an enable section (e.g., a high level status) of the command latch enable signal CLE in relation to the toggle timing of the write enable signal nWE. The memory interface circuit 212*b* may acquire the address ADDR from the data signal DQ received in the enable section (e.g., a high level status) of the address latch enable signal ALE in relation to the toggle timing of the write enable signal nWE.

In some embodiments, the write enable signal nWE holds a static status (e.g., a high level or a low level) and then may be toggled between the high level and the low level. For example, the write enable signal nWE may be toggled at the section in which the command CMD or the address ADDR is transmitted. Accordingly, the memory interface circuit 212*b* may acquire the command CMD or the address ADDR in relation to the toggle timing of the write enable signal nWE.

The memory interface circuit 212*b* may receive a read enable signal nRE from the storage controller 210 through the fifth pin P15. The memory interface circuit 212*b* may receive the data strobe signal DQS from the storage controller 210 through a sixth pin P16, or may transmit the data strobe signal DQS to the storage controller 210.

During the data output operation of the NVM 220, the memory interface circuit 212*b* may receive the read enable signal nRE toggled through fifth pin P15 before outputting the data (DATA). The memory interface circuit 212*b* may generate the data strobe signal DQS toggled in response to the toggling of the read enable signal nRE. For example, the memory interface circuit 212*b* may generate the data strobe signal DQS that starts toggling after a predetermined delay (e.g., tDQSRE) in relation to the toggling start time of the read enable signal nRE. The memory interface circuit 212*b* may transmit a data signal DQ including the data in response to the toggle timing of the data strobe signal DQS. As a result, the data may be arranged at the toggle timing of the data strobe signal DQS and transmitted to the storage controller 210.

During the data input operation of the NVM 220, when the data signal DQ including the data (DATA) is received from the storage controller 210, the memory interface circuit 212*b* may receive the data strobe signal DQS toggled together with the data from the storage controller 210. The memory interface circuit 212*b* may acquire the data from the data signal DQ in response to the toggle timing of the data strobe signal DQS. For example, the memory interface circuit 212*b* may acquire the data DATA by sampling the data signal DQ at a rising edge and a falling edge of the data strobe signal DQS.

The memory interface circuit 212*b* may transmit a ready/busy output signal nR/B to the storage controller 210 through an eighth pin P18. The memory interface circuit 212*b* may transmit the status information of the NVM 220 to the storage controller 210 through the ready/busy output signal nR/B. When the NVM 220 is in the busy status (e.g., when the internal operations of the NVM 220 are being performed), the memory interface circuit 212*b* may transmit the ready/busy output signal nR/B indicating the busy status to the storage controller 210. When the NVM 220 is in the ready status (i.e., the internal operations of the NVM 220 are not performed or are completed), the memory interface circuit 212*b* may transmit the ready/busy output signal nR/B indicating the ready status to the storage controller 210.

For example, while the NVM 220 reads the data (DATA) from the memory cell array 320 in response to a page read command, the memory interface circuit 212b may transmit the ready/busy output signal nR/B indicating the busy status (e.g., a low level) to the storage controller 210. For example, while the NVM 220 programs the data (DATA) into the memory cell array 320 in response to the program instruction, the memory interface circuit 212b may transmit the ready/busy output signal nR/B indicating the busy status to the storage controller 210.

The control logic circuit 310 may generally control various operations of the NVM 220. The control logic circuit 310 may receive the command/address CMD/ADDR acquired from the memory interface circuit 212b. The control logic circuit 310 may generate control signals for controlling other components of the NVM 220 according to the received command/address CMD/ADDR. For example, the control logic circuit 310 may generate various control signals for programing the data (DATA) in the memory cell array 320 or reading the data (DATA) from the memory cell array 320

The memory cell array 320 may store the data DATA acquired from the memory interface circuit 212b under the control of the control logic circuit 310. The memory cell array 320 may output the stored data (DATA) to the memory interface circuit 212b under the control of the control logic circuit 310.

The memory cell array 320 may include memory cells, such as flash memory cells. However, the scope of the inventive concept is not limited thereto, and the memory cells may include PRAM cells, Resistive Random Access Memory (RRAM) cells, Ferroelectric Random Access Memory (FRAM) cells, Thyristor Random Access Memory (TRAM) cells and/or Magnetic Random Access Memory (MRAM) cell, etc. However, herein, illustrated embodiments will be described that assume the use of NAND flash memory cells.

The storage controller 210 may include first to eighth pins P21 to P28, and a controller interface circuit 212a. The first to eighth pins P21 to P28 may correspond to the first to eighth pins P11 to P18 of the NVM 220.

The controller interface circuit 212a may transmit a chip enable signal nCE to the NVM 220 through a first pin P21. The controller interface circuit 212a may transmit and receive signals to and from the NVM 220 selected through the chip enable signal nCE through the second to eighth pins P22 to P28.

The controller interface circuit 212a may transmit the command latch enable signal CLE, the address latch enable signal ALE, and the write enable signal nWE to the NVM 220 through the second to fourth pins P22 to P24. The controller interface circuit 212a may transmit the data signal DQ to the NVM 220 or receive the data signal DQ from the NVM 220 through a seventh pin P27.

The controller interface circuit 212a may transmit the data signal DQ including the command CMD or the address ADDR to the NVM 220 along with a toggled write enable signal nWE. The controller interface circuit 212a may transmit the data signal DQ including the command CMD to the NVM 220 by transmitting the command latch enable signal CLE having the enable status, and may transmit the data signal DQ including the address ADDR to the NVM 220 by transmitting the address latch enable signal ALE having the enable status.

The controller interface circuit 212a may transmit the read enable signal nRE to the NVM 220 through the fifth pin P25. The controller interface circuit 212a may receive the data strobe signal DQS from the NVM 220 through the sixth pin P26, or may transmit the data strobe signal DQS to the NVM 220.

During the data output operation of the NVM 220, the controller interface circuit 212a may generate a toggling read enable signal nRE and transmit the read enable signal nRE to the NVM 220. For example, the controller interface circuit 212a may generate the read enable signal nRE that changes from the static status (e.g., a high level or a low level) to the toggle status before the data (DATA) is output. As a result, the data strobe signal DQS toggling in relation to the read enable signal nRE may be generated in the NVM 220. The controller interface circuit 212a may receive the data signal DQ including the data DATA along with the toggled data strobe signal DQS from the NVM 220. The controller interface circuit 212a may acquire the data (DATA) from the data signal DQ in response to the toggle timing of the data strobe signal DQS.

During the data input operation of the NVM 220, the controller interface circuit 212a may generate a toggled data strobe signal DQS. For example, the controller interface circuit 212a may generate a data strobe signal DQS that changes from the static status (e.g., a high level or a low level) to the toggle status before transmitting the data (DATA). The controller interface circuit 212a may transmit the data signal DQ including the data (DATA) to the NVM 220 in response to the toggle timing of the data strobe signal DQS.

The controller interface circuit 212a may receive a ready/busy output signal nR/B from the NVM 220 through the eighth pin P28. The controller interface circuit 212a may discriminate the status information of the NVM 220 in relation to the ready/busy output signal nR/B.

Figure 15:
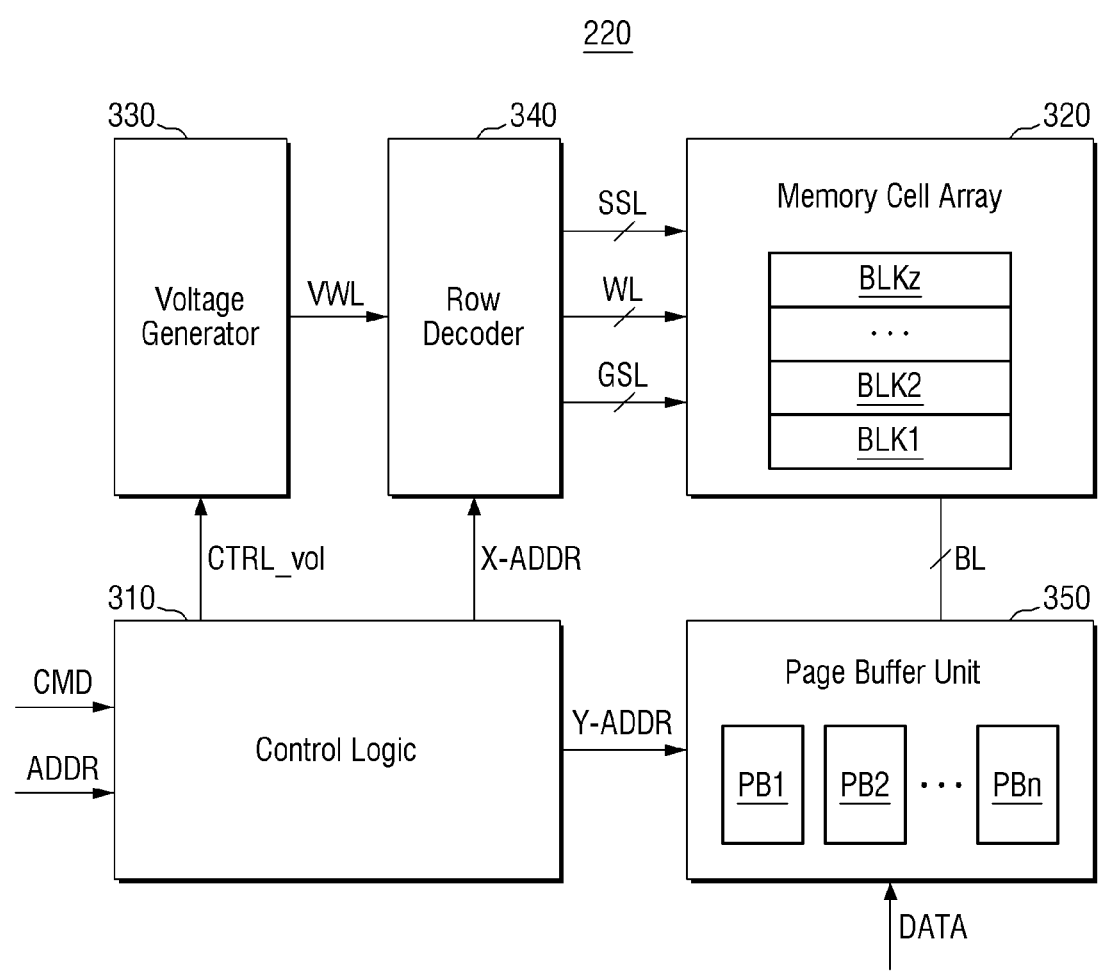
FIG. 15 is a block diagram further illustrating in one example the NVM 220 of FIG. 13.

FIG. 15 is a block diagram further illustrating in one example the NVM 220 of FIG. 13.

Referring to FIGS. 13 and 15, the NVM 220 may include a control logic circuitry 310, a memory cell array 320, a page buffer 350, a voltage generator 330, and a row decoder 340. In some embodiments, the NVM 220 may include the memory interface circuitry 212b. In addition, the NVM 220 may further include a column logic, a pre-decoder, a temperature sensor, a command decoder, and/or an address decoder.

The control logic circuitry 310 may control all various operations of the NVM 220. The control logic circuitry 310 may output various control signals in response to commands CMD and/or addresses ADDR from the memory interface circuitry 212b. For example, the control logic circuitry 310 may output a voltage control signal CTRL_vol, a row address X-ADDR, and a column address Y-ADDR.

The memory cell array 320 may include memory blocks BLK1 to BLKz, wherein 'z' is a positive integer. The memory cell array 320 may be connected to the page buffer 350 through bit lines BL and be connected to the row decoder 340 through word lines WL, string selection lines SSL, and ground selection lines GSL.

In some embodiments, the memory cell array 320 may include a 3D memory cell array including NAND strings. Here, each of the NAND strings may include memory cells respectively connected to word lines vertically stacked on a substrate. In this regard, the collectively subject matter of U.S. Pat. Nos. 7,679,133; 8,553,466; 8,654,587; 8,559,235, as well as published U.S. Patent Application 2011/0233648 is hereby incorporated by reference. Alternately, the memory cell array 320 may include a 2D memory cell array, which includes NAND strings arranged in a row direction and a column direction.

The page buffer 350 may include page buffers PB1 to PBn, wherein 'n' is an integer greater than 2, which may be respectively connected to the memory cells through bit lines BL. The page buffer 350 may select at least one of the bit lines BL in response to the column address Y-ADDR. The page buffer 350 may operate as a write driver or a sense amplifier according to an operation mode. For example, during a program operation, the page buffer 350 may apply a bit line voltage corresponding to data to be programmed, to the selected bit line. During a read operation, the page buffer 350 may sense current or a voltage of the selected bit line BL and sense data stored in the memory cell.

The voltage generator 330 may generate various kinds of voltages for program, read, and erase operations based on the voltage control signal CTRL_vol. For example, the voltage generator 330 may generate a program voltage, a read voltage, a program verification voltage, and an erase voltage as a word line voltage VWL.

The row decoder 340 may select one of word lines WL and select one of string selection lines SSL in response to the row address X-ADDR. For example, the row decoder 340 may apply the program voltage and the program verification voltage to the selected word line WL during a program operation and apply the read voltage to the selected word line WL during a read operation.

Figure 16:
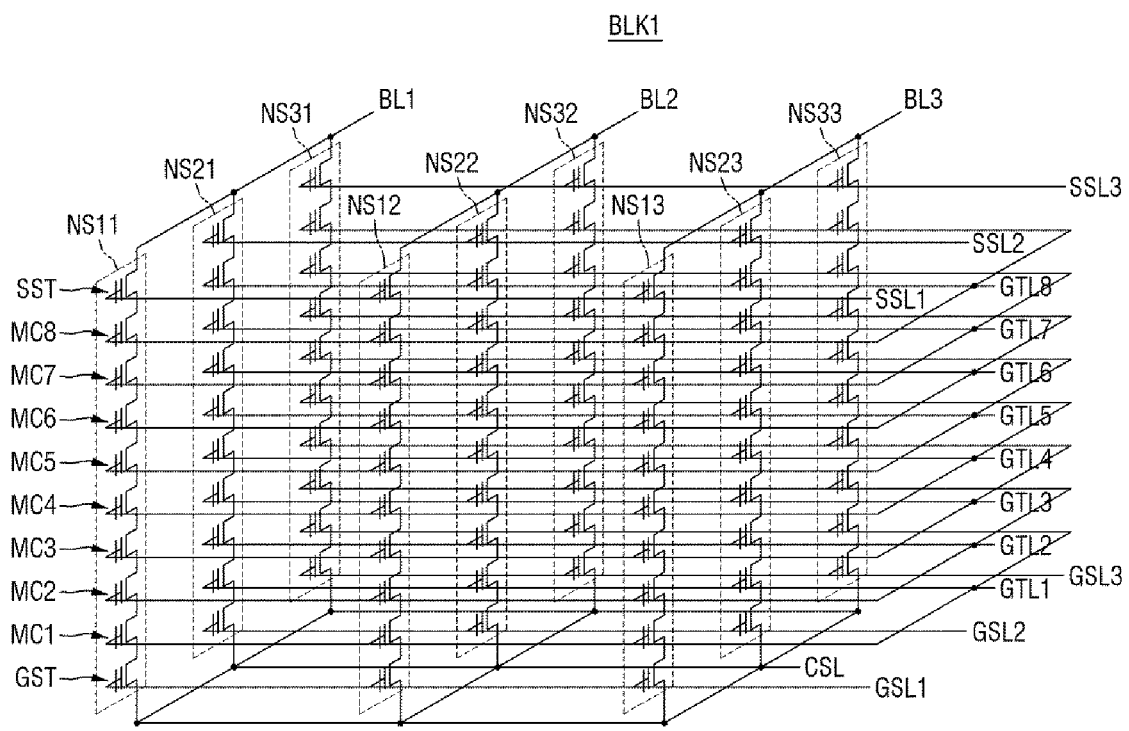
FIG. 16 is a partial circuit diagram of a 3D V-NAND that may be applied to the NVM memory in certain embodiments of the inventive concept.

The memory block BLKi shown in the partial circuit diagram of FIG. 16 shows a memory block BLK1 having a 3D structure on a substrate. Here, NAND strings included in the memory block BLK1 may be formed in a direction perpendicular to the substrate.

Referring to FIG. 16, the memory block BLK1 may include NAND strings (e.g., NS11 to NS33) connected between bit lines BL1, BL2, and BL3 and a common source line CSL. Each of the NAND strings NS11 to NS33 may include a string selection transistor SST, memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 16, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to word lines, and some of the gate lines GTL1, GTL2, . . . , and GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., WL1) at the same level may be connected in common, and the ground selection lines GSL1, GSL2, and GSL3 and the string selection lines SSL1, SSL2, and SSL3 may be separated from each other. FIG. 16 illustrates a case in which a memory block BLK1 is connected to eight gate lines GTL1, GTL2, . . . , and GTL8 and three bit lines BL1, BL2, and BL3, without being limited thereto.

Figure 17:
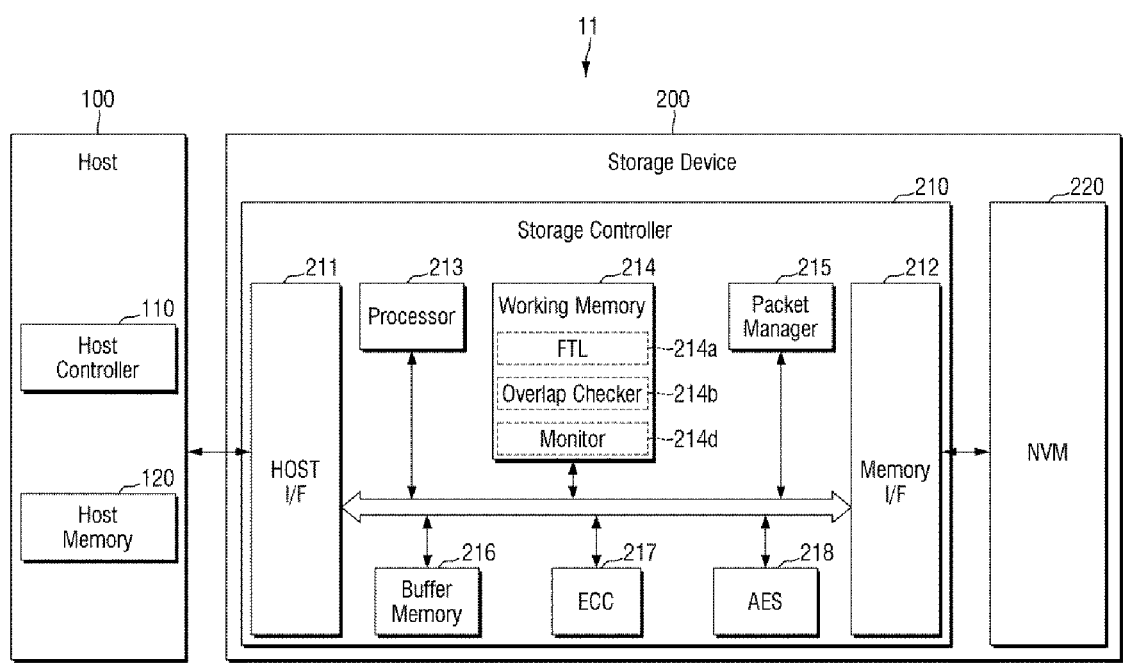
FIG. 17 is a block diagram illustrating a memory system according to embodiments of the inventive concept.

FIG. 17 is a block diagram illustrating a memory system 11 according to embodiments of the inventive concept.

Referring to FIG. 17, the memory system 11 may further include in relation to the memory system 10 of FIG. 13—a monitor 214d, that in some embodiments may be loaded into the working memory 214. Here, the monitor 214d may correspond to the monitor 1270 previously described.

The monitor 214d may be implemented as firmware and/or software driven by the storage device 200. The monitor 214d may control the operation of the storage controller 210. Alternately, the monitor 214d may be implemented as hardware and/or firmware driven by the storage device 200. In some embodiments, the monitor 214d may be implemented as separate hardware and included in the storage device 200.

Figure 18:
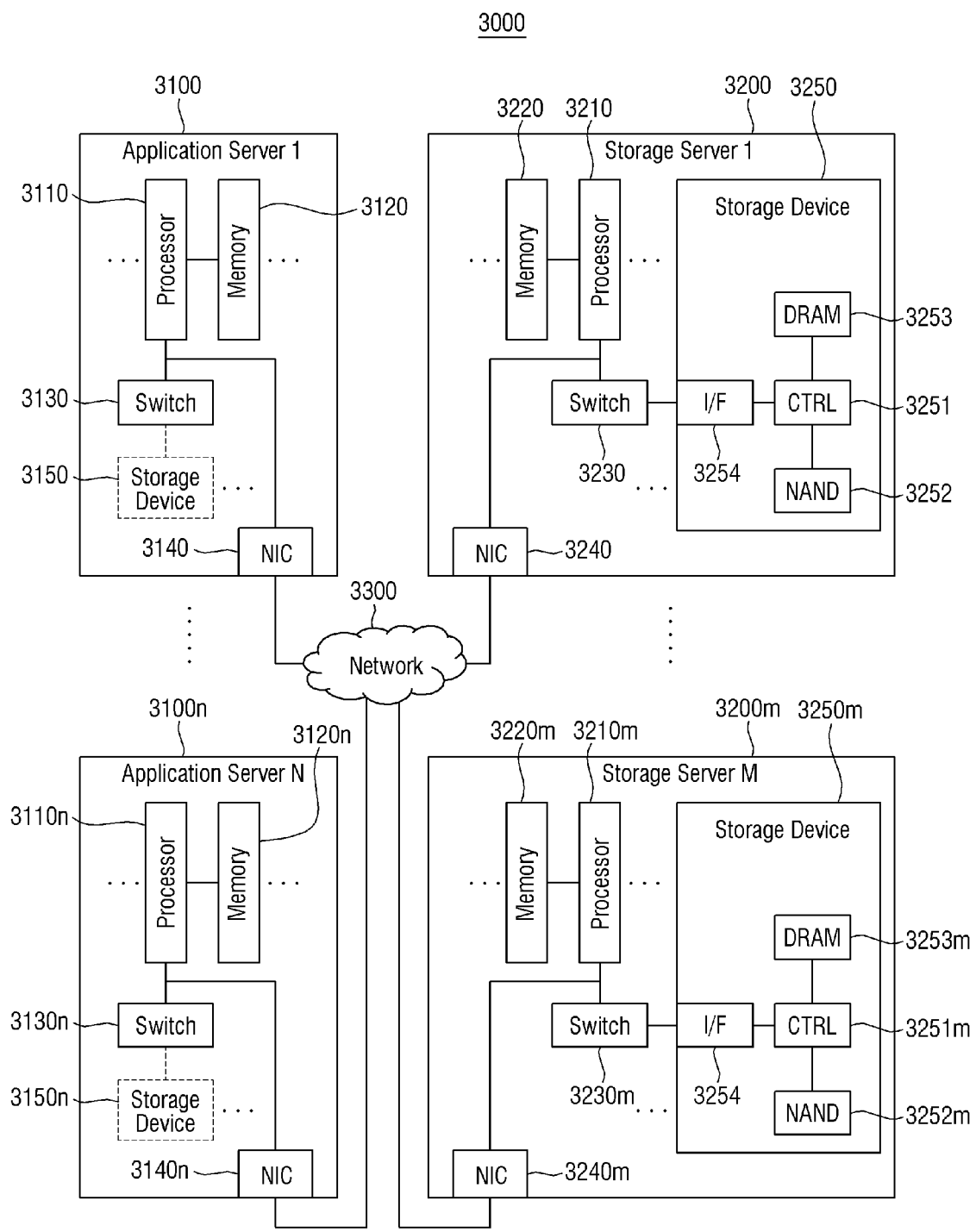
FIG. 18 is a conceptual block diagram illustrating a data center that may include a storage system according to embodiments of the inventive concept.

FIG. 18 is a block diagram illustrating a data center 3000 that may incorporate one or more storage systems according to embodiments of the inventive concept.

Referring to FIG. 18, the data center 3000 may be a facility that collects various types of data, provides related data processing services, and may be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In some embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternately, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

The storage server 3200 will now be described as an example. An interface 3254 may provide physical connection between a processor 3210 and a controller 3251 and a physical connection between a NIC 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as an Advanced Teachnology Attachment (ATA), a serial ATA (SATA), an express SATA (e-SATA), a Small Computer System Interface (SCSI), a Serial Attached SCSI (SAS), a Peripheral Component Interconnect (PCI), an express PCI (PCIe), a NVMe, interfaces related to IEEE Standard 1394, a Universal Serial Bus (USB) interface, an Secure Digital (SD) card interface, an MMC interface, an eMMC interface, a UFS interface, an eUFS interface, and/or a CF card interface.

The storage server 3200 may further include a switch 3230 and the NIC 3240. The switch 3230 may selectively connect the processor 3210 to the storage device 3250 or selectively connect the NIC 3240 to the storage device 3250 via the control of the processor 3210.

In an embodiment, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

The storage server 3200 may correspond to the storage system 1000 described above. The storage devices 3150 to 3150n and 3250 to 3250m may correspond to the storage device 200 described above.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

Those skilled in the art will appreciate that many variations and modifications may be made to the preferred embodiments without substantially departing from the scope of the inventive concept, as defined by the following claims.

What is claimed is:
1. A storage system comprising:
a storage device; and
an overlap checker configured to:
  receive input/output (I/O) commands,
  extract characteristics of each of the I/O commands including a logical address and an offset, and
  issue to the storage device a first merge command including N first I/O commands among the I/O commands, each of the N first I/O commands restricted to the same first logical address and a different one of continuous offsets, wherein

'N' is a predetermined value and is a natural number greater than 1.

2. The storage system of claim 1, wherein:
the overlap checker is further configured to issue a second merge command including M second I/O commands, among the I/O commands, in response to the extracted characteristics,
'M' is a natural number greater than 1 and different from N, and
the first I/O commands are different from the second I/O commands.

3. The storage system of claim 2, wherein the overlap checker is further configured to:
monitor a speed at which the storage device executes the first merge command to generate a monitoring result, and
determine M based on the monitoring result.

4. The storage system of claim 2, wherein the overlap checker is further configured to issue the second merge command once the storage device completes execution of an operation instructed by the first merge command.

5. The storage system of claim 2, wherein:
a 1st I/O command among the first I/O commands has the same offset as a 1st I/O command among the second I/O commands, and
the overlap checker is further configured to receive the 1st I/O command among the second I/O commands after receiving the 1st I/O command among the first I/O commands.

6. The storage system of claim 1, wherein the storage device is configured to:
execute the first merge command, and
notify the overlap checker upon execution of the first merge command.

7. The storage system of claim 1, wherein the overlap checker includes a pending queue configured to store the I/O commands.

8. The storage system of claim 1, wherein the overlap checker comprises:
a first overlap checker configured to issue the first merge command in relation to the first logical address; and
a second overlap checker configured to issue a second merge command in relation to a second logical address.

9. A storage system comprising:
a storage device; and
an overlap checker configured to:
receive a first input/output (I/O) command instructing an operation on a position corresponding to an offset in a region of the storage device corresponding to a logical address,
store the logical address and the offset in a pending queue, and
issue to the storage device a first merge command including N first I/O commands, each of the N first I/O commands restricted to the logical address and a different one of continuous offsets, wherein
'N' is a predetermined value and is a natural number greater than 1.

10. The storage system of claim 9, wherein:
the first I/O commands include a third I/O command and a fourth I/O command,
at least one of the third I/O command and the fourth I/O command instructs an operation on a position corresponding to a first offset in the region of the storage device corresponding to the logical address, and
the overlap checker is further configured to:
issue the first merge command including the third I/O command, and
issue a second merge command, different from the first merge command, including the fourth I/O command.

11. The storage system of claim 10, wherein the overlap checker is further configured to receive the third I/O command before receiving the fourth I/O command.

12. The storage system of claim 10, wherein:
the second merge command includes M I/O commands,
'M' is a natural number greater than 1 and different from N.

13. The storage system of claim 9, wherein:
at least one of the first I/O commands instructs the storage device to:
write first data at a position corresponding to the offset and the logical address; or
read second data stored at the position corresponding to the offset and the logical address, and
a first size of the first data and a second size of the second data are smaller than a size of the region.

14. A method for operating a storage system including a storage device and an overlap checker, the method comprising:
executing in the storage device a first operation instructed by a first input/output (I/O) command in a first region of the storage device corresponding to a first logical address; and
receiving second I/O commands, wherein:
upon execution by the storage device of the first operation instructed by the first I/O command, the overlap checker issues to the storage device a first merge command including N of the second I/O commands, each of the N second I/O commands restricted to the first logical address and a different one of continuous offsets, and
'N' is a predetermined value and is a natural number greater than 1.

* * * * *